United States Patent Office.

CHAUNCEY J. OLDS, OF VALLEY FALLS, ASSIGNOR TO THE SCHAGHTICOKE POWDER COMPANY, OF SCHAGHTICOKE, AND THE LAFLIN & RAND POWDER COMPANY, OF NEW YORK, N. Y.

GUNPOWDER.

SPECIFICATION forming part of Letters Patent No. 381,507, dated April 17, 1888.

Application filed May 24, 1887. Serial No. 239,219. (Specimens.)

*To all whom it may concern:*

Be it known that I, CHAUNCEY J. OLDS, a citizen of the United States, residing at Valley Falls, in the county of Rensselaer and State of New York, have invented a new and useful Composition of Matter of the Nature of Gunpowder, of which the following is a specification.

My composition consists of the following ingredients, viz: saltpeter, sulphur, charcoal made from willow or other trees at present in use for this purpose, and charcoal made from peas.

In common with all practical manufacturers of gunpowder, I have found it necessary to vary the proportions of saltpeter, sulphur, and charcoal in producing different grades of gunpowder, and the same is true as regards a particular grade—for instance, the standard grade known in the trade as "rifle-powder." In order that the latter grade may possess density, gravity, velocity, and pressure, adapting it for use in fire-arms differing in caliber and twist, the quantities of said ingredients must be proportionately varied in compounding it to meet the requirements of each.

By combining seventy-five pounds of saltpeter, nine pounds of sulphur, eleven and one-half pounds of charcoal made from willow trees, and four and one-half pounds of carbonized peas I have produced a rifle-powder showing excellent results; but in order to adapt this particular grade composed of said ingredients for use in the different fire-arms in common use I have, for reasons previously stated, found it necessary to vary the proportions of said ingredients.

The ingredients of my compound are pulverized, reduced to a plastic state by adding thereto a sufficient quantity of water, and thoroughly mingled while in that state. The composition is then subjected to pressure, broken into grains of the required size, or otherwise shaped to meet the demands of the trade. The said ingredients may, however, by a similar process be properly compounded in a dry state, no water being used.

By the combination of the last above-named ingredients a gunpowder is produced which is superior to that of the same grade in common use, for the following reasons, viz:

First. It possesses more perfect cohesion. By compressing the smaller grains of my compound the large grains, known as "prismatic powder," are produced, which are more perfectly cohering than those of that grade in common use.

Second. Its hygroscopic properties are lower. After an exposure in an air-tight box containing water for a period of one hundred and twenty hours, together with nine samples of powder of the same grade, the products of five different manufacturers, it had absorbed less moisture than either of the others, all the samples when first placed in the box being thoroughly dry and of equal weight.

Third. While showing a velocity equal to that of either of said samples, it exerts less pressure upon the fire-arm. A test in this particular of my compound and of said samples, the charges being of equal weight, showed a pressure upon the fire-arm by the latter of from twenty thousand pounds to twenty-eight thousand pounds per square inch, while that exerted by my compound was but seventeen thousand five hundred pounds per square inch.

Fourth. Its combustion qualities are more uniform, the residuum after firing being less. The nature, also, of the residuum is entirely different from that of either of the samples of rifle-powder before referred to, in this, to wit, that while the residuum of the latter is of a hard dry nature, its particles in some instances adhering so firmly to the groove of the barrel as to furrow the bullet when fired therefrom, and requiring for its removal the use of a damp cloth and oiled wiper, the residuum of my compound is of an oily nature, furnishing sufficient lubrication for the bullet, insuring accurate and continued firing without the necessity of cleaning the arm in the meantime, from which said residuum may be readily and fully removed, even after remaining therein for a period of three days or more, by use for that purpose of a dry cloth only, the fire-arm having sustained no injurious effects from its adherence thereto.

I do not limit myself to the special ingredients or proportions given above, as my invention consists of the combination of carbonized peas, as herein described, with the well-known gunpowder ingredients named herein, and with other equivalent ingredients when substituted therefor.

What I claim is—

An explosive compound consisting of carbonized peas combined with saltpeter, sulphur, and charcoal made from willow or other trees, substantially as described.

CHAUNCEY J. OLDS.

Witnesses:
WM. H. HAWKINS,
WM. P. BLISS.